United States Patent [19]

Ruetschi

[11] 4,209,574
[45] Jun. 24, 1980

[54] LONG-LIFE ALKALINE PRIMARY CELL HAVING LOW WATER CONTENT

[75] Inventor: Paul Ruetschi, Yverdon, Switzerland

[73] Assignee: Leclanche S.A., Canton of Vaud, Switzerland

[21] Appl. No.: 55,336

[22] Filed: Jul. 6, 1979

[30] Foreign Application Priority Data

Jul. 6, 1978 [CH] Switzerland ............... 7353/78

[51] Int. Cl.² .................................. H01M 6/04
[52] U.S. Cl. ....................... 429/133; 429/162; 429/206
[58] Field of Search ............... 429/133, 162, 188, 206, 429/174, 185, 218, 219, 229, 230

[56] References Cited

U.S. PATENT DOCUMENTS

| | | | |
|---|---|---|---|
| 3,427,203 | 2/1969 | Fletcher | 429/230 X |
| 4,011,103 | 3/1977 | Kordesch | 429/66 |
| 4,015,055 | 3/1977 | Langan et al. | 429/145 |
| 4,048,405 | 9/1977 | Megahed | 429/206 |
| 4,136,236 | 1/1979 | Ruetschi | 429/206 |

*Primary Examiner*—Anthony Skapars
*Attorney, Agent, or Firm*—Lockwood, Dewey, Alex & Cummings

[57] ABSTRACT

A flat, long-life alkaline primary cell having a low water content comprises a positive electrode of mercuric oxide or silver oxide, a negative electrode of amalgamated zinc or cadmium, and separator layers disposed between the electrodes. The positive electrode lies upon a disc of nickel screening. Flanged edges of two of the separator layers are gripped between a cover and a sealing ring. The electrolyte absorbed by the separator layers is a mixture of sodium hydroxide, potassium hydroxide, and rubidium hydroxide. The number of moles of water per mole of alkali hydroxide is 2.0–2.7 for sodium hydroxide, 2.4–3.1 for potassium hydroxide, and 2.8–4.0 for rubidium hydroxide.

6 Claims, 3 Drawing Figures

LONG-LIFE ALKALINE PRIMARY CELL HAVING LOW WATER CONTENT

This invention relates to alkaline primary cells, and more particularly to a long-life alkaline primary cell having a low water content.

Miniature alkaline batteries are used in electronic timepieces, pacemakers, hearing aids, pocket calculators, and telecommunications equipment. Owing to the progress made in electronics, it has been possible to achieve successively greater reductions in the current consumption of such apparatus within recent years. As a result, a demand has arisen for increasingly smaller batteries. For certain applications, it is particularly desirable to keep at least one dimension of the battery as small as possible. However, the construction of ultraflat alkaline cells presents not inconsiderable technological difficulties. The electrodes must be made very thin and disposed very close together.

For many applications, the life of the batteries is of great importance. With decreasing current consumption of battery-powered electronic apparatus, requirements for battery life are constantly being raised. A battery life of five to ten years or longer is being sought nowadays for some applications. Mercuric oxide and silver oxide are slightly, but measurably, soluble in alkaline electrolytes. The dissolving of the positive active material may be described as follows:

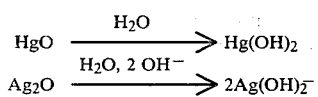

The resultant dissolved molecules or anions reach the negative electrode by diffusion in the electrolyte. There they are reduced, with an equivalent amount of negative electrode material being oxidized. This means a corresponding loss of capacitance for the battery. Thus, this process leads to slow self-discharge.

In the applicant's co-pending U.S. patent application Ser. No. 900,271, it is proposed that the positive electrode be formed of two pellets disposed one above the other, the upper pellet, facing the negative electrode, being made of less soluble, more stable $\gamma$-$MnO_2$ which reduces the diffusion of dissolved mercuric oxide or silver oxide from the lower pellet.

For very flat batteries, the two pellets must be kept very thin, and this presents not inconsiderable technical difficulties. Moreover, as the upper electrode decreases in thickness, it becomes continuously less effective in preventing the diffusion of dissolved molecules or anions of mercuric oxide or silver oxide.

U.S. Pat. No. 4,136,236 proposes that diffusion of the aforementioned dissolved substances be restricted by means of a so-called filter electrode covering the entire electrochemical surface. Here, too, the thicker the filter electrode can be made, the more effective is its action.

In ultraflat batteries, however, the height is so limited that only extremely thin filter electrodes can be utilized. The separator layers must also be kept thin in such batteries, and the actual battery electrodes must be disposed very close to one another, which naturally favors the undesirable diffusion of dissolved positive material between the electrodes.

It is an object of this invention to provide a galvanic cell having an alkaline electrolyte, small dimensions, and a long life, and wherein self-discharge resulting from diffusion is restricted.

To this end, there is provided according to the present invention a long-life alkaline primary cell having a low water content, comprising a positive electrode of silver oxide or mercuric oxide, a negative electrode, and an alkali hydroxide electrolyte, wherein the water content of the cell as a whole does not exceed an amount represented by the formula $$w = (n_{NaOH} \cdot f_{NaOH}) + (n_{KOH} \cdot f_{KOH}) + (n_{RbOH} \cdot f_{RbOH})$$

wherein
 $w$ = moles of water per cell
 $n_{NaOH}$ = moles NaOH per cell
 $n_{KOH}$ = moles KOH per cell
 $n_{RbOH}$ = moles RbOH per cell
 $f_{NaOH}$ = 2.0 to 2.7
 $f_{KOH}$ = 2.4 to 3.1
 $f_{RbOH}$ = 2.8 to 4.0

In a particular embodiment, the primary cell may be designed as an ultraflat, button-type miniature cell. The negative electrodes are preferably of amalgamated zinc. Furthermore, seperator layers saturated with an alkaline electrolyte may be disposed between the electrodes.

In miniature alkaline batteries constructed according to the present invention, the self-discharge can be reduced so greatly that a life of five to ten years or longer can be achieved. It has hiterto been thought that a very long life, e.g., of 10 years, could be achieved only with lithium batteries.

Preferred embodiments of the invention will now be described in detail, by way of example, with reference to the accompanying drawing, in which.

Figure 1:
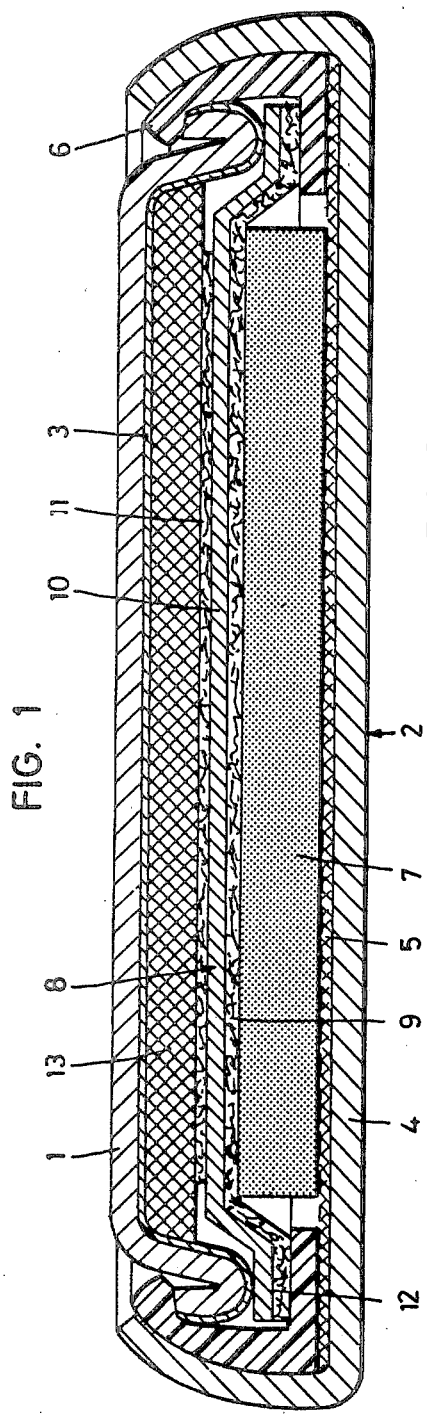
FIG. 1 is a section through an ultraflat button cell.

FIG. 1 is a cross-section through a first embodiment of the invention. The casing of the alkaline primary cell comprises a cover 1 and a cup 2 which may be made of nickel-plated sheet steel, of stainless steel, or of a non-rusting nickel alloy. Applied to the inside of the cover 1 is a layer 3 of copper or bronze. An electrically conductive contact disc 5 of nickel screening is placed in the bottom 4 of the cup 2. A sealing ring 6 presses the edge of the disc 5 against the bottom 4. A positive electrode 7 of silver oxide or mercuric oxide, disposed upon the disc 5 of nickel screening, is in contact only with the middle portion, but not with the edge, of the disc 5. At least a membrane portion 10 of a separator 8, comprising layers 9–11, is gripped at the edge thereof between the cover 1 and the sealing ring 6 and has the shape of a shallow, prefabricated dish with a flanged peripheral portion 12. Between the separator 8 and the cover 1, a negative electrode 13 of amalgamated zinc is disposed. The layer 9 of the separator 8, facing the positive electrode 7, is of polypropylene felt, the middle layer 10 is a membrane of polyethylene-methacrylic acid copolymer, and the layer 11, facing the negative electrode 13, is again of polypropylene. The sealing ring 6 is of nylon, neoprene, or the synthetic resin polymer product sold under the registered trademark "Teflon". The separator layers 9–11 are saturated with an alkaline electrolyte.

The button cell may, for example, be from 7.9 to 11.6 mm in diameter and from 1.5 to 3.5 mm high.

Figure 2:
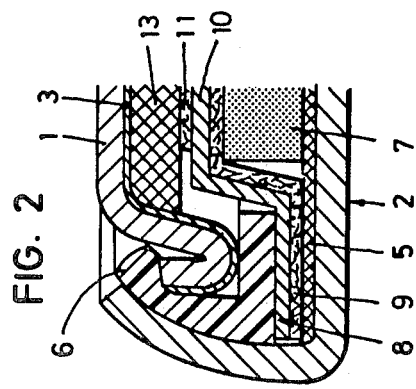
FIG. 2 is a section through another embodiment of a button cell.

Another embodiment of an ultraflat button cell is illustrated in FIG. 2. Here, however, the edges of the separator layers 9 and 10 are gripped between the sealing ring 6 and the contract disc 5. In this embodiment, too, the separator layers 9 and 10 characteristically have the shape of shallow dishes with peripheral flanges.

An effective measure for reducing the diffusion of dissolved mercuric oxide or silver oxide consists in limiting the water content of the cell in such a way that the cell has a whole contains no more than 2.7 moles of $H_2O$ per mole of NaOH, no more than 3.1 moles of $H_2O$ per mole of KOH, and no more than 4 moles of $H_2O$ per mole of RbOH.

In the construction of ultraflat button cells according to this invention, the pellet of the positive electrode 7 is disposed substantially within the space defined by the sealing ring 6 and the cell cover 1. The ring 6 itself rests practically speaking directly upon the flat cell bottom 4. As a result, more height is available for the pellet of poitive, active material and for any filter or protective electrodes.

The arrangement shown in FIGS. 1 and 2 is distinguished from previous button-cell designs by the dish-shaped, flanged separator 8 and by a positive electrode 7 which is accommodated substantially in the space formed by the sealing ring 6 and the cover 1 but does not reach to the edge porion of the cup 2 under the ring 6.

Figure 3:
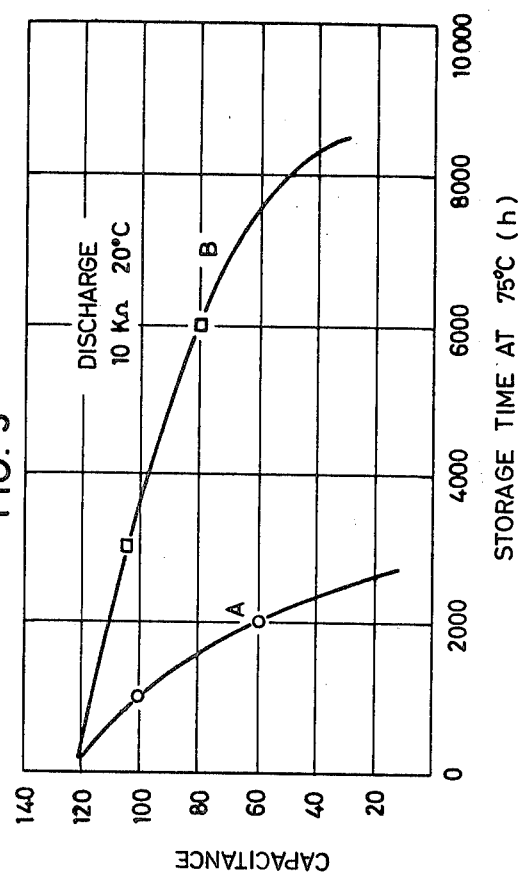
FIG. 3 is a graph showing capacitance as a function of storage time for a conventional cell (A) and for a cell according to the present invention (B).

The extraordinarily great increase in the storage life of a miniature alkaline cell according to this invention is apparent from the shape of the curves in FIG. 3. Mercuric oxide-zinc cells 11.4 mm in diameter and 3.5 mm high were subjected to an accelerated ageing test in which they were stored at the very high temperature of 75° C. The cells were removed from the warming cupboard from time to time and then discharged at room temperature across a resistance of 10 kilohms.

Curve A relates to results with cells containing a conventional electrolyte, viz., 40% KOH. The separators consisted of a combination of polypropylene felts and cellophane films.

Curve B shows results with a cell of exactly the same construction but containing an electrolyte according to the present invention with 51.5% KOH. In addition, all cell components were carefully dried prior to assembly. The result was an approximately tripled storage life as compared with the cells of curve A. For the cells of curve B, a life of over 10 years at room temperature is extrapolated.

The reason for the unexpected improvement in storage life is the lessened diffusion of dissolved mercuric oxide which is obtained owing to the use of the cell construction with low water content according to the present invention.

The ratio of the number of moles of water to the number of moles of alkali hydroxide present in an alkaline primary cell exerts an unexpected and hitherto unheeded influence upon the self-discharge of the cell.

The alkaline primary cell according to this invention contains, for example, not more than 3.1 moles of water per mole of potassium hydroxide, i.e. per kilogram of water (55.5 moles $H_2O$) at least 18 moles KOH must be present (molality m=18). For a pure KOH solution, this would correspond to a density of 1.513 g/cm$^3$ at 20° C., to a concentration expressed per unit of weight of 50.25% KOH, and to a mole/l concentration of 13.5.

The number of moles of alkali hydroxide, e.g., KOH, to be used in the calculation according to this invention corresponds to the total number of the alkali equivalents present, e.g., potassium.

The number of moles of $H_2O$ to be used in the calculation corresponds to the total water content of the cell after deduction of the weight of the alkali hydroxide in the form MOH, wherein M represents Na$^+$, K$^+$ or Rb$^+$. This stipulation is necessary for electrolytes containing zinc oxide, and in which the equilibrium

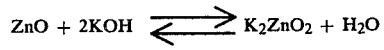

$$ZnO + 2KOH \rightleftharpoons K_2ZnO_2 + H_2O$$

is adjusted.

The previous technical literature, and important recent patent specifications in particular, recommend much lower electrolyte concentrations, as shown in the following table:

Table 1

| Source | Battery System | Previously Customary Electrolyte Concentration in Alkaline Primary Cells — Recommended Electrolyte Concentration without Zincate |
|---|---|---|
| S. Rubens in The Primary Battery, ed. by G. Heise & N.C. Cahoon. N.Y., J. Wiley, 1971. Vol. 1, p. 207 | HgO—Zn | 40% KOH |
| E.A. Schumacher, ibid., p. 179 | ? | 10N KOH = 40% 12N NaOH = 35% |
| U.S. Pat. Nos. 3,427,203 & 3,418,847 to Fletcher | HgO—Zn | 40% KOH |
| U.S. Pat. No. 3,418,172 to Kordesch et al. | MnO$_2$—Zn | 37% KOH |
| U.S. Pat. No. 4,011,103 to Kordesch | MnO$_2$—Zn | 35% KOH |
| T.P. Dirkse in The Primary Battery, op. cit., p. 229 | Ag$_2$O—Zn | 30-40% KOH |
| U.S. Pat. Nos. 4,048,405 & 4,015,056 to El Sayed Megahed | AgO—Zn | 40% KOH |
| U.S. Pat. No. 4,015,055 to Langan et al. | Ag$_2$O—Zn  AgO—Zn | 33% KOH |

The difference between prior practice and the present invention will be further elucidated by means of the following example: According to U.S. Pat. No. 3,418,177, a mercury-zinc button cell of type 675, 11.6 mm in diameter and 5.4 mm high, contains a zinc electrode consisting of 0.25 to 0.28 g of zinc powder. This zinc electrode is first wetted with 0.035 to 0.115 g of potassium hydroxide in 40% concentration. Next, the remainder of the electrolyte, viz., 0.105 to 0.115 g potassium hydroxide, likewise in 40% concentration, is measured out onto the separator. This cell then contains a total of 0.5 g of potassium hydroxide in 40% concentration, i.e., 0.06 g KOH and 0.09 g $H_2O$. With the molecular weights of 56 for KOH and 18 for water, this yields a molar ratio of $1.07 \cdot 10^{-3}$ KOH to $5 \cdot 10^{-3}$ $H_2O$, or 4.67 moles of $H_2O$ per mole of KOH.

In contrast thereto, an identical cell according to the present invention would contain, for example, 0.15 g of KOH electrolyte in a concentration of, e.g., 51.5%, corresponding to a molar ratio of KOH to $H_2O$ of 1:2.9.

In calculating the molar ratio $KOH:H_2O$ according to this invention, it must be taken into account that other cell components, such as the positive active material, separators, sealing rings, gelling agent for the electrolyte, etc., may also contain water. It has even been customary until now to moisten the positive active material with water or dilute alkali hydroxide solutions prior to pelletizing. Positive electrodes often contain manganese dioxide as well, which is known to contain physically and chemically bound water.

In calculating the correct molar ratio of alkali hydroxide to water, it is necessary, according to the invention, to add the water in the aforementioned cell components to the water in the measured quantity of electrolyte. The molar ratio of alkali hydroxide to water to be observed according to the invention includes the water contained in the other cell components to the extent that it can be maintained in equilibrium with the electrolyte.

The water equilibrium in the cell probably adjusts itself via the water-vapor pressure equilibrium. In a cell according to the invention having a KOH electrolyte, for example, the vapor pressure at 20° C., after adjustment of the equilibrium, amounts to less than 6 mm Hg.

The alkali hydroxide-water ratio must be adapted to the nature of the alkali hydroxide. The permissible number of moles of water per mole of alkali hydroxide is 2.0–2.7 for NaOH, 2.4–3.1 for KOH and 2.8–4.0 for RbOH.

It has proved particularly advantageous to use mixtures of alkali hydroxides in certain cases. Especially the addition of potassium hydroxide to sodium hydroxide, for example, or of rubidium hydroxide to sodium hydroxide, allows a welcome lowering of the freezing point of the solution without affecting its advantageous properties with regard to self-discharge. In such cases, the total permissible amount of water per cell is calculated cumulatively from the amounts of the respective alkali hydroxides.

Instead of mixing alkali hydroxides, it is sometimes advantageous to wet the negative electrode and the positive electrode separately, each with a different electrolyte. For example, the negative electrode may be wetted with sodium hydroxide solution and the positive electrode with potassium or rubidium hydroxide solution.

Furthermore, the initial electrolyte concentration in the negative electrode may, for example, be made higher than in the positive electrode, whereby a quicker initial soaking of the positive electrode is obtained.

In all these cases, however, the total permissible water content per cell is cumulatvely calculated according to the following formula:

$$w = (n_{NaOH} \cdot f_{NaOH}) + (n_{KOH} \cdot f_{KOH}) + (f_{RbOH} \cdot f_{RbOH})$$

wherein
$w$ = moles $H_2O$ per cell
$n_{NaOH}$ = moles NaOH per cell
$n_{KOH}$ = moles KOH per cell
$n_{RbOH}$ = moles RbOH per cell
$f_{NaOH}$ = 2.0 to 2.7
$f_{KOH}$ = 2.4 to 3.1
$f_{RbOH}$ = 2.8 to 4.0

Furthermore, in the reduction to practice of the present invention, it has also proved advantageous thoroughly to dry the positive electrode, and especially any $MnO_2$ contained therein, in order to prevent an undesired and uncontrollable transfer of $H_2O$ from the positive electrode to the electrolyte.

Thus, during manufacture of the cells, it is not sufficient simply to monitor the concentration of the dosage of electrolyte and to maintain it within the indicated limits. In order to secure the advantages of the present invention, the entire water content of the cell must be taken into account.

It is known that non-desiccated $\gamma$-$MnO_2$ may contain up to 5% $H_2O$. A positive electrode weighing 1.5 g and containing 10% non-desiccated $\gamma$-$MnO_2$, for example, could therefore transfer up to 7.5 mg $H_2O$ to the electrolyte. However, if the dosage of electrolyte contains a total of only 75 mg $H_2O$, just the water emanating from the $\gamma$-$MnO_2$ could cause appreciable dilution of the electrolyte.

The water content recommended according to the invention may be adapted within the indicated limits to the particular temperature conditions under which the cells are to be used. In pacemakers, where the temperature during use is 37° C., water contents down to the minimum limit indicated may be utilized. In electronic timepieces, in which the cells are also supposed to operate even at temperature of 0° C., for example, water contents close to the maximum limits indicated, as well as the use of potassium hydroxide and especially rubidium hydroxide, are preferred.

The zincate produced during discharge of the zinc electrodes also appears to exert an effect tending to lower the freezing-point. It is presumed that as result of the increase in zincate concentration in the electrolyte in the course of the discharge, which takes place when the electrolyte is not already originally saturated with zincate at the time of dosing,

water is really released from OH ions, which is tantamount to an acutal dilution.

The electrolyte composition according to the invention is particularly suitable for use in ultraflat button-type cells.

What is claimed is:
1. A long-life alkaline primary battery cell having a low water content, comprising a positive electrode of silver oxide or mercuric oxide, a negative electrode, and an alkali hydroxide electrolyte, wherein the water con- tent of said cell as a whole does not exceed an amount represented by the formula $$w = (n_{NaOH} \cdot f_{NaOH}) + (n_{KOH} \cdot f_{KOH}) + (n_{RbOH} \cdot f_{RbOH})$$

wherein
 W = moles of water per cell
 $n_{NaOH}$ = moles NaOH per cell
 $n_{KOH}$ = moles KOH per cell
 $n_{RbOH}$ = moles RbOH per cell
 $f_{NaOH}$ = 2.0 to 2.7
 $f_{KOH}$ = 2.4 to 3.1
 $f_{RbOH}$ = 2.8 to 4.0.

2. A primary cell in accordance with claim 1 taking the form of an ultraflat button-type cell, further comprising a cup, a cover, a sealing ring, and a dish-shaped separator having a flanged edge, said separator being disposed between said positive electrode and said negative electrode, and said flanged edge being gripped between said cover and said sealing ring.

3. A primary cell in accordance with claim 1 taking the form of an ultraflat button-type cell, further comprising a cup having a bottom, a cover, a sealing ring, and a dish-shaped separator having a flanged edge, said separator being disposed between said positive electrode and said negative electrode, and said flanged edge being gripped between said sealing ring and said bottom.

4. A primary cell in accordance with claim 2 or claim 3, wherein said positive electrode takes the form of a pellet substantially accommodated within a space bounded by said sealing ring and said cover but does not extend to the peripheral portion of said cup under said sealing ring.

5. A primary cell in accordance with claim 1 taking the form of an ultra-flat button-type cell, further comprising a cup forming the positive pole and having a bottom, a sealing ring, and an electrically conductive contact disc of nickel screening resting on said bottom, the edge of said disc being pressed against said bottom by said sealing ring.

6. A primary cell in accordance with claim 1, wherein said positive electrode and said negative electrode are separately wetted with different electrolytes.

* * * * *

UNITED STATES PATENT AND TRADEMARK OFFICE
CERTIFICATE OF CORRECTION

PATENT NO. : 4,209,574
DATED : June 24, 1980
INVENTOR(S) : Paul Ruetschi

It is certified that error appears in the above-identified patent and that said Letters Patent are hereby corrected as shown below:

Column 2, line 25, "seperator" should read --separator--

Column 3, line 29, "porion" should read --portion--

Column 5, line 12, "0.5" should read --0.15--

Column 6, line 4, "cumulat vely" should read --cumulatively--

Signed and Sealed this

Twenty-first Day of October 1980

[SEAL]

Attest:

SIDNEY A. DIAMOND

Attesting Officer

Commissioner of Patents and Trademarks